United States Patent
Tomi et al.

[11] Patent Number: 6,162,372
[45] Date of Patent: Dec. 19, 2000

[54] LIQUID CRYSTAL COMPOSITIONS AND LIQUID CRYSTAL DISPLAY DEVICES

[75] Inventors: Yoshitaka Tomi, Moriyama; Fusayuki Takeshita, Sodegaura; Etsuo Nakagawa, Ichihara, all of Japan

[73] Assignee: Chisso Corporation, Osaka-Fu, Japan

[21] Appl. No.: 09/388,443

[22] Filed: Sep. 2, 1999

[30] Foreign Application Priority Data

Sep. 10, 1998 [JP] Japan .................. 10-256409

[51] Int. Cl.$^7$ .................. C09K 19/06; C09K 19/12; C09K 19/30
[52] U.S. Cl. ............... 252/299.6; 252/299.63; 252/299.66
[58] Field of Search .............. 252/299.6, 299.63, 252/299.66

[56] References Cited

U.S. PATENT DOCUMENTS

| | | | |
|---|---|---|---|
| 4,439,340 | 3/1984 | Kojima et al. | 252/299.63 |
| 4,536,321 | 8/1985 | Sugimori et al. | 252/299.63 |
| 4,778,620 | 10/1988 | Goto et al. | 252/299.63 |
| 4,877,548 | 10/1989 | Kitano et al. | 252/299.63 |
| 5,032,313 | 7/1991 | Goto et al. | 252/299.63 |
| 5,045,229 | 9/1991 | Bartmann et al. | 252/299.01 |
| 5,589,102 | 12/1996 | Bartmann et al. | 252/299.01 |
| 5,728,319 | 3/1998 | Matsui et al. | 252/299.63 |
| 5,792,386 | 8/1998 | Matsui et al. | 252/299.01 |
| 5,961,881 | 10/1999 | Andou et al. | 252/299.63 |
| 6,007,740 | 12/1999 | Andou et al. | 252/299.63 |

FOREIGN PATENT DOCUMENTS

| | | |
|---|---|---|
| 58-10552 | 1/1983 | Japan . |
| 59-176240 | 10/1984 | Japan . |
| 63-152334 | 6/1988 | Japan . |
| 1-308239 | 12/1989 | Japan . |
| 2-233626 | 9/1990 | Japan . |
| 2-237949 | 9/1990 | Japan . |
| 4-300861 | 10/1992 | Japan . |
| 5-112778 | 5/1993 | Japan . |
| 7-300582 | 11/1995 | Japan . |
| 7-300584 | 11/1995 | Japan . |
| 7-300585 | 11/1995 | Japan . |
| 10-251186 | 9/1998 | Japan . |
| 96/11897 | 4/1996 | WIPO . |

OTHER PUBLICATIONS

"A new, highly multiplexable liquid crystal display", T.J. Scheffer et al., Appl. Phys. Lett. 45 (10), Nov. 15, 1984, pp. 1021–1023.

*Primary Examiner*—C. H. Kelly
*Attorney, Agent, or Firm*—McDermott, Will & Emery

[57] ABSTRACT

A liquid crystal composition is disclosed which comprises three components. The first component comprises at least one of the compounds of the following formulas (1-1) and (1-2). The second component comprises at least one of the compounds of the following formula (2). The third component comprises at least one of the compounds of the following formulas (3-1) to (3-4).

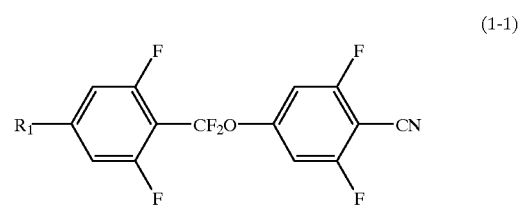

(1-1)

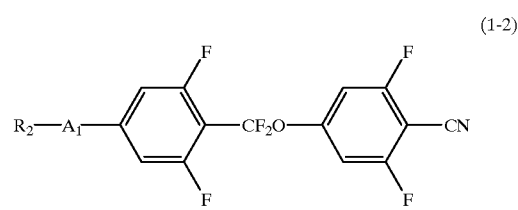

(1-2)

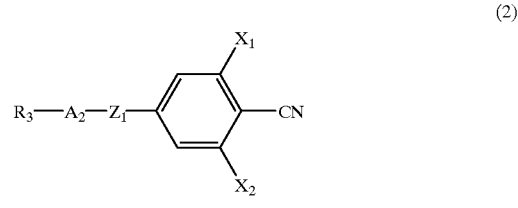

(2)

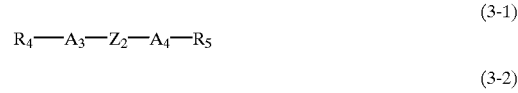

(3-1)

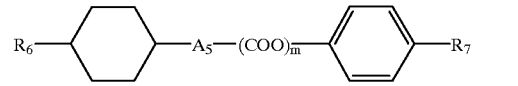

(3-2)

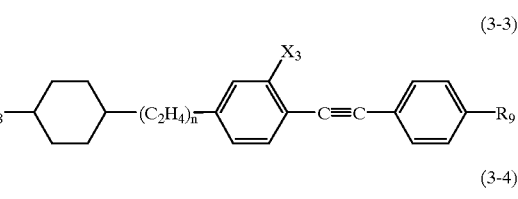

(3-3)

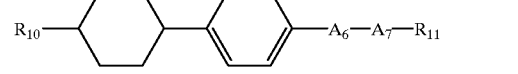

(3-4)

Each symbol in formulas (1-1) to (3-4) is defined in the specification. The liquid crystal composition has low threshold voltage and high stability to hear and ultraviolet rays while satisfying general characteristics required for the STN display mode.

9 Claims, No Drawings

LIQUID CRYSTAL COMPOSITIONS AND LIQUID CRYSTAL DISPLAY DEVICES

FIELD OF THE INVENTION

This invention relates to a nematic liquid crystal composition. More particularly, the invention relates to a liquid crystal composition suitable for a supertwisted nematic (STN) mode and to a liquid crystal display device using the liquid crystal composition.

BACKGROUND OF THE INVENTION

As a display mode for a liquid crystal display device (LCD), various modes have been proposed such as twisted nematic (TN) mode, supertwisted nematic (STN) mode, active matrix (AM-LCD) mode, etc., which have been put to practical use. Of these practical modes, the STN mode having the orientation of liquid crystal molecules in the upper and lower substrates twisted at 180–270° which was proposed by T. J. Scheffer, et al. (Appl. Phys. Lett. 45 (10), 1021 (1984)) has been used for the LCD of personal computers or the like.

In recent years, the STN mode is prevailing in the use of a liquid crystal display device for hand-held terminals, e.g. electronic notepads, laptop computers which are often used in the open air.

The liquid crystal compositions used in the STN mode have required the following general characteristics (1) to (4). In addition, the liquid crystal compositions used in the STN mode in the open air have required the following general characteristics (5) and (6).

(1) A steepness of the liquid crystal composition should be improved as well as possible in order to increase a contrast of the liquid crystal display device. (The voltage-transmittance characteristics (steepness) should be steep.)

(2) A viscosity of the liquid crystal composition should be reduced as low as possible in order to decrease a response time of the liquid crystal display device.

(3) An optical anisotropy of the liquid crystal composition can take a suitable value depending on a cell thickness of the liquid crystal display device in order to optimize a contrast of the liquid crystal display device.

(4) The liquid crystal composition should exhibit a nematic phase in a wide temperature range in order to extend an environmental temperature at which the liquid crystal display device is used. (The upper-limit temperature of the nematic phase is increased and the lower-limit temperature of the nematic phase is reduced.)

(5) A threshold voltage of the liquid crystal composition should be reduced in order to provide a smaller-sized battery serving as a power for driving the liquid crystal display device. Further, a temperature dependence of the threshold voltage of the liquid crystal composition should be reduced.

(6) The liquid crystal composition should have a high stability to heat and ultraviolet ray in order to prevent degradation of the liquid crystal composition and maintain semi-permanently the display quality of the liquid crystal display device.

The liquid crystal compositions for STN having relatively low threshold voltage and relatively good temperature characteristics of the threshold voltage are disclosed in Japanese Patent Kokai 7-300582, Japanese Patent Kokai 7-300585 and Japanese Patent Kokai 7-300584. Those compositions have the problem of poor stability to heat and ultraviolet ray, as shown in comparative examples which will be given later.

As liquid crystal compounds for low-voltage driving in various modes including active matrix and STN modes, WO 96/11897 discloses new liquid crystalline compounds having high dielectric anisotropy and very low viscosity as well as liquid crystal compositions containing said compounds. Composition Examples 19–22 of WO 96/11897 illustrate the compositions which contain the compounds having $-CF_2O-$ as a linking group and having 3,5-difluoro-4-cyanophenyl at the end group. The composition shown in Composition Example 19 is analogous to that of the present invention, but has the problems of poor steepness, high threshold voltage and high temperature dependence of the threshold voltage.

Thus there is a continuing need for an improved liquid crystal composition.

SUMMARY OF THE INVENTION

An object of the invention is to provide a liquid crystal composition especially having low threshold voltage, low temperature dependence of threshold voltage and high stability to heat and ultraviolet ray, while satisfying general characteristics required for the STN display mode.

Through our intensive studies on compositions using various liquid crystalline compounds in an effort to solve the above-mentioned problems, we have found that the above object can be achieved by using the liquid crystal composition of the present invention in a display device for STN.

DETAILED DESCRIPTION OF THE INVENTION

The present invention provides a liquid crystal composition which comprises:

as a first component at least one of the compounds of the following formulas (1-1) and (1-2);
as a second component at least one of the compounds of the following formula (2); and
as a third component at least one of the compounds of the following formulas (3-1) to (3-4)

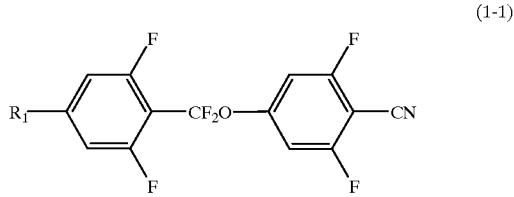
(1-1)

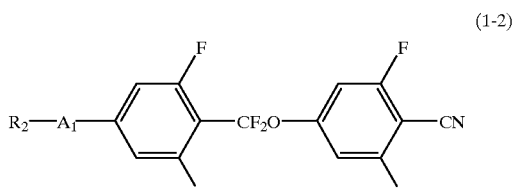
(1-2)

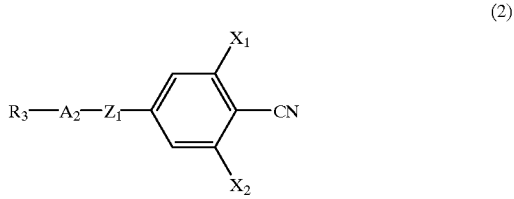
(2)

(3-1)

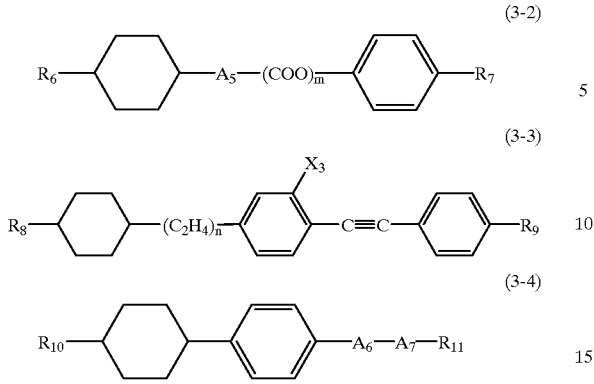

(3-2)

(3-3)

(3-4)

in which $R_1$, $R_2$ and $R_3$ each independently represent an alkyl group of 1–10 carbons wherein any one of the —$CH_2$— groups may be replaced by —O— or —CH=CH—; $R_4$, $R_5$ and $R_6$ each independently represent an alkyl group of 1–10 carbons wherein any one of the —$CH_2$— groups may be replaced by —O— or —CH=CH—, or wherein one or more hydrogen atoms may be replaced by fluorine atoms; $R_7$ represents Cl, F or an alkyl group of 1–10 carbons wherein any one of the —$CH_2$— groups may be replaced by —O—; $R_8$, $R_9$ and $R_{11}$ each independently represent an alkyl group of 1–10 carbons; $R_{10}$ represents an alkyl group of 1–10 carbons wherein any one of the —$CH_2$— groups may be replaced by —O—; A, represents trans-1,4-cyclohexylene or trans-1,3-dioxane-2,5-diyl; $A_2$, $A_3$, $A_4$, $A_5$ and $A_7$ each independently represent trans-1,4-cyclohexylene or 1,4-phenylene; $A_6$ represents 1,4-phenylene which may be substituted by F; $Z_1$ represents —COO—, —$CH_2CH_2$— or a single bond; $Z_2$ represents —C≡C— or a single bond; m and n each independently represent 0 or 1; and $X_1$, $X_2$ and $X_3$ each independently represent H or F.

In one embodiment of the liquid crystal composition, the first component comprises 5–50% by weight, the second component comprises 5–40% by weight and the third component comprises 10–70% by weight, based on the total weight of the liquid crystal composition.

The liquid crystal composition of the invention may further comprise as a fourth component at least one of the compounds of the following formula (4)

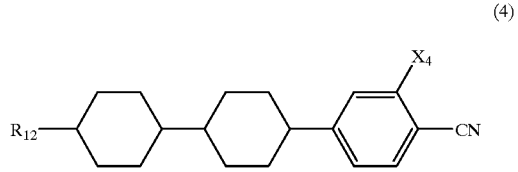

(4)

wherein $R_{12}$ represents an alkyl group of 1–10 carbons and $X_4$ represents H or F. In one embodiment of said liquid crystal composition, the first component comprises 5–50% by weight, the second component comprises 5–40% by weight, the third component comprises 10–70% by weight and the fourth component comprises not more than 35% by weight, preferably 5% to 30% by weight, of at least one of the compounds of formula (4), based on the total weight of the liquid crystal composition.

The liquid crystal composition of the invention may further comprise as a fourth component at least one of the compounds of the following formula (5)

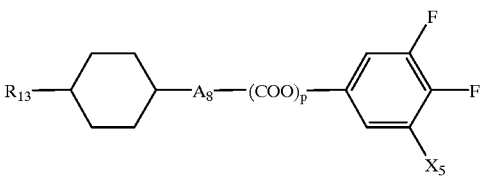

(5)

wherein $R_{13}$ represents an alkyl group of 1–10 carbons; $A_8$ represents trans-1,4-cyclohexylene or 1,4-phenylene; p represents 0 or 1; and X. represents H or F. In one embodiment of said liquid crystal composition, the first component comprises 5–50% by weight, the second component comprises 5–40% by weight, the third component comprises 10–70% by weight and the fourth component comprises not more than 25% by weight, preferably 5% to 20% by weight, of at least one of the compounds of formula (5), based on the total weight of the liquid crystal composition.

The liquid crystal composition of the invention may further comprises as a fourth component at least one of the compounds of formula (4) and as a fifth component at least one of the compounds of formula (5). In one embodiment of said liquid crystal composition, the first component comprises 5–50% by weight, the second component comprises 5–40% by weight, the third component comprises 10–70% by weight, the fourth component comprises not more than 35% by weight, preferably 5% to 30% by weight, of at least one of the compounds of formula (4) and the fifth component comprises not more than 25% by weight, preferably 5% to 20% by weight, of at least one of the compounds of formula (5), based on the total weight of the liquid crystal composition.

Further, the present invention provides a liquid crystal display device using each of the above-described liquid crystal compositions according to the present invention.

PREFERRED EMBODIMENTS OF THE INVENTION

Preferred examples of the compounds of formula (1-1) used in the liquid crystal composition of the invention can include those of the following formula (1-1-1)

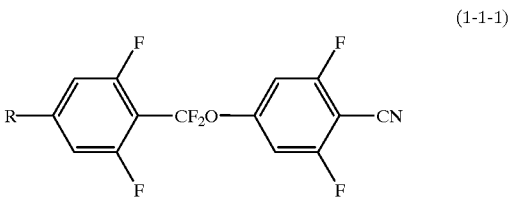

(1-1-1)

wherein R represents an alkyl group of 1–10 carbons, an alkoxymethyl group of 2–9 carbons or an alkenyl group of 2–10 carbons.

Preferred examples of the compounds of formula (1-2) used in the liquid crystal composition of the invention can include those of the following formulas (1-2-1) and (1-2-2)

(1-2-1)

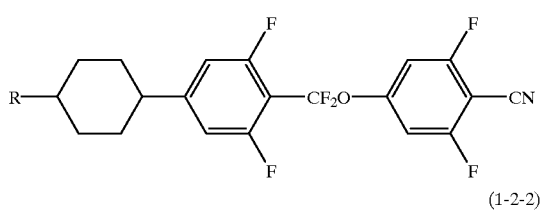

(1-2-2)

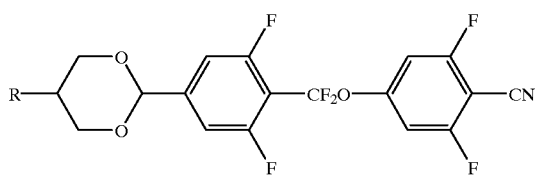

wherein each R independently represents an alkyl group of 1–10 carbons, an alkoxymethyl group of 2–9 carbons or an alkenyl group of 2–10 carbons.

Preferred examples of the compounds of formula (2) used in the liquid crystal composition of the invention can include those of the following formulas (2-1) to (2-8)

(2-1)

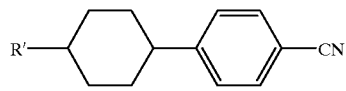

(2-2)

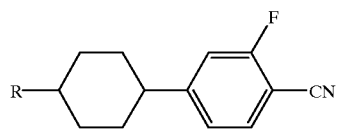

(2-3)

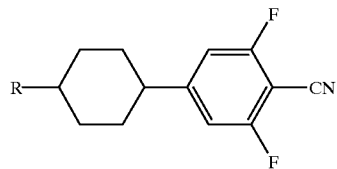

(2-4)

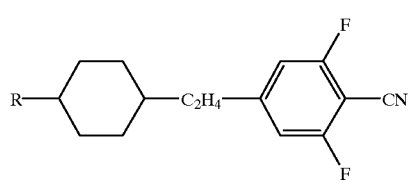

(2-5)

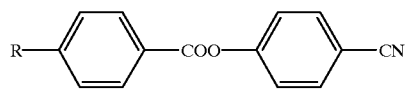

(2-6)

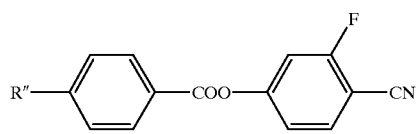

(2-7)

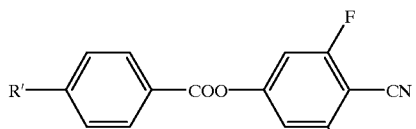

(2-8)

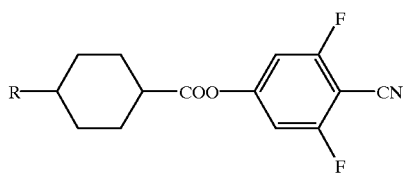

wherein each R independently represents an alkyl group of 1–10 carbons, each RI independently represents an alkyl group of 1–10 carbons or an alkenyl group of 2–10 carbons and R" represents an alkyl group of 1–10 carbons or an alkoxymethyl group of 2–9 carbons.

Preferred examples of the compounds of formula (3-1) used in the liquid crystal composition of the invention can include those of the following formulas (3-1-1) to (3-1-4)

(3-1-1)

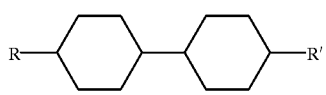

(3-1-2)

(3-1-3)

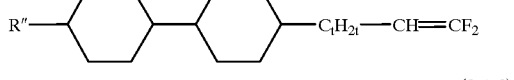

(3-1-4)

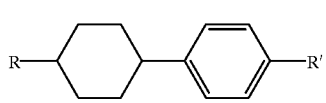

wherein each R independently represents an alkyl group of 1–10 carbons, each R' independently represents an alkyl group of 1–10 carbons or an alkoxy group of 1–10 carbons, each R" independently represents an alkyl group of 1–10 carbons or an alkenyl group of 2–10 carbons and t represents an integer of 0 to 8.

Preferred examples of the compounds of formula (3-2) used in the liquid crystal composition of the invention can include those of the following formulas (3-2-1) to (3-2-7)

(3-2-1)

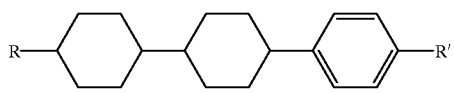

-continued (3-2-2)
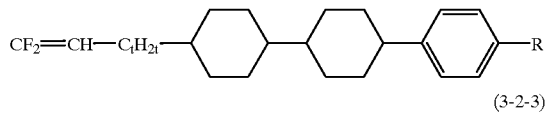

(3-2-3)
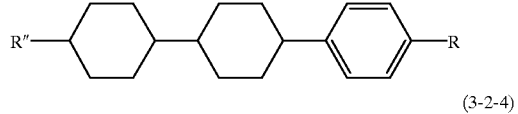

(3-2-4)
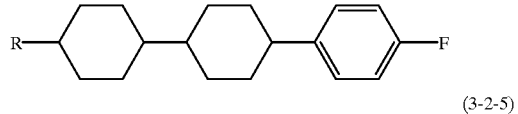

(3-2-5)
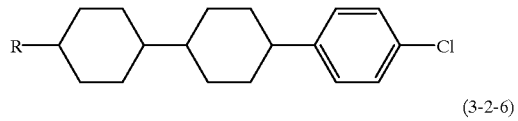

(3-2-6)
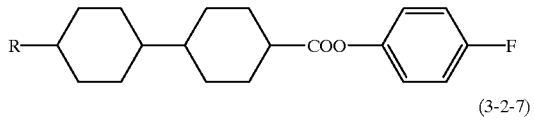

(3-2-7)
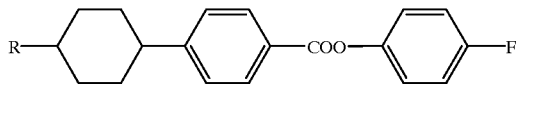

wherein each R independently represents an alkyl group of 1–10 carbons, R' represents an alkyl group of 1–10 carbons or an alkoxy group of 1–10 carbons, R" represents an alkenyl group of 2–10 carbons and t represents an integer of 0 to 8.

Preferred examples of the compounds of formula (3-3) used in the liquid crystal composition of the invention can include those of the following formulas (3-3-1) to (3-3-2)

(3-3-1)
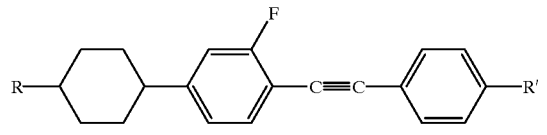

(3-3-2)
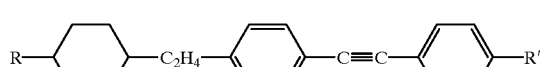

wherein R and R' each independently represent an alkyl group of 1–10 carbons.

Preferred examples of the compounds of formula (3-4) used in the liquid crystal composition of the invention can include those of the following formulas (3-4-1) to (3-4-2)

(3-4-1)
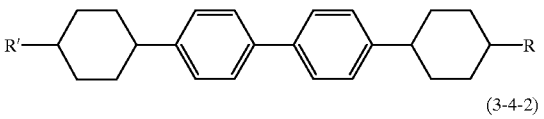

(3-4-2)
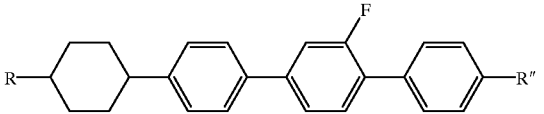

wherein R and R" each independently represent an alkyl group of 1–10 carbons and R' represents an alkyl group of 1–10 carbons or an alkoxymethyl group of 2–9 carbons.

Preferred examples of the compounds of formula (4) used in the liquid crystal composition of the invention can include those of the following formulas (4-1) and (4-2)

(4-1)
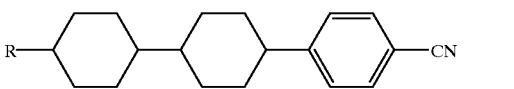

(4-2)
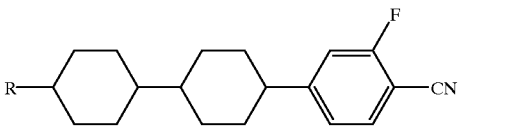

wherein each R independently represents an alkyl group of 1–10 carbons.

Preferred examples of the compounds of formula (5) used in the liquid crystal composition of the invention can include those of the following formulas (5-1) to (5-4)

(5-1)
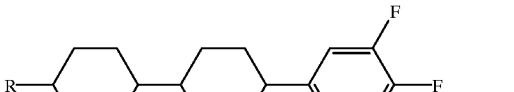

(5-2)
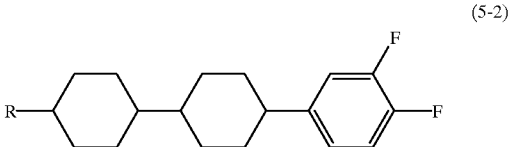

(5-3)
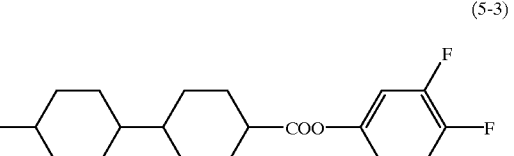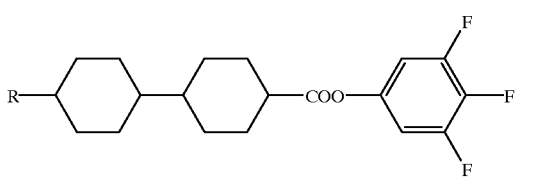

-continued (5-4)

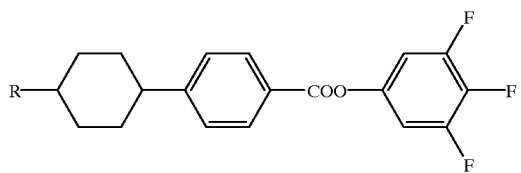

wherein each R independently represents an alkyl group of 1–10 carbons.

A role of each compound constituting the liquid crystal composition of the invention will be explained below.

The compounds of formulas (1-1) and (1-2) are characterized in that a dielectric anisotropy is high, a rate of change of a dielectric anisotropy to a temperature change is substantially identical with a rate of change of an elastic constant to a temperature change and a stability to heat and ultraviolet ray is high. Thus the compounds of formulas (1-1) and (1-2) are used for the purpose of reducing the threshold voltage and further reducing the temperature dependence of threshold voltage, while keeping the stability of the liquid crystal composition to heat and ultraviolet ray high.

The compounds of formula (2) have a dielectric anisotropy substantially equal to or less than that of the compounds of formulas (1-1) and (1-2). Thus the compounds of formula (2) are used for the purpose of further reducing the threshold voltage of the liquid crystal composition.

The compounds of formula (3-1) are characterized in that a dielectric anisotropy is approximately zero and a viscosity is low. Thus the compounds of formula (3-1) are used for the purpose of reducing the viscosity of the liquid crystal composition and simultaneously adjusting the threshold voltage of the liquid crystal composition.

The compounds of formula (3-2) are characterized in that a dielectric anisotropy is approximately zero, a clearing point is high and a viscosity is low. Thus the compounds of formula (3-2) are used for the purpose of increasing the clearing point of the liquid crystal composition, simultaneously reducing the viscosity and adjusting the threshold voltage.

The compounds of formula (3-3) are characterized in that a dielectric anisotropy is approximately zero, a clearing point is high, a viscosity is low and an optical anisotropy is high. Thus the compounds of formula (3-3) are used for the purpose of increasing the clearing point of the liquid crystal composition, simultaneously reducing the viscosity and further adjusting the optical anisotropy and threshold voltage of the liquid crystal composition.

The compounds of formula (3-4) are characterized in that a dielectric anisotropy is approximately zero, a viscosity is low and a clearing point is especially high. Thus the compounds of formula (3-4) are used for the purpose of increasing the clearing point of the liquid crystal composition, simultaneously reducing the viscosity and adjusting the threshold voltage.

The compounds of formula (4) are characterized by having a slightly lower positive dielectric anisotropy than those of formulas (1-1) and (1-2) as well as high clearing point. Thus the compounds of formula (4) are used for the purpose of adjusting the clearing point and threshold voltage of the liquid crystal composition.

The compounds of formula (5) have a slightly lower positive dielectric anisotropy than those of formulas (1-1) and (1-2). Thus the compounds of formula (5) are used for the purpose of adjusting the threshold voltage of the liquid crystal composition.

A preferable component ratio of the compound constituting the liquid crystal composition of the invention and the reason therefor will be explained below.

Incorporating a large quantity of the compounds of formulas (1-1) and (1-2) into the liquid crystal composition may result in raising the lower-limit temperature of a nematic phase in the liquid crystal composition. For this reason, it is desirable that the compounds of formulas (1-1) and (1-2) make up not more than 50% by weight of the liquid crystal composition. Further, it is desirable that the compounds of formulas (1-1) and (1-2) make up not less than 5% by weight of the liquid crystal composition for the reasons of reducing the threshold voltage and further reducing the temperature dependence of threshold voltage while keeping high stability of the liquid crystal composition to heat or ultraviolet.

Incorporating a large quantity of the compounds of formula (2) into the liquid crystal composition may result in raising the lower-limit temperature of a nematic phase in the liquid crystal composition. For this reason, it is desirable that the compounds of formula (2) make up not more than 40% by weight of the liquid crystal composition. Further, it is desirable that the compounds of formulas (2) make up not less than 5% by weight of the liquid crystal composition in order to reduce more the threshold voltage of the liquid crystal composition.

Incorporating a large quantity of the compounds of formulas (3-1) to (3-4) into the liquid crystal composition may result in raising the threshold voltage of the liquid crystal composition. For this reason, it is desirable that the compounds of formulas (3-1) to (3-4) make up not more than 70% by weight of the liquid crystal composition. Further, it is desirable that the compounds of formulas (3-1) to (3-4) make up not less than 10% by weight of the liquid crystal composition in order to reduce the viscosity of the liquid crystal composition as low as possible.

Incorporating a large quantity of the compounds of formula (4) into the liquid crystal composition may result in raising the lower-limit temperature of a nematic phase in the liquid crystal composition. For this reason, it is desirable that the compounds of formula (4) make up not more than 35% by weight of the liquid crystal composition.

Incorporating a large quantity of the compounds of formula (5) into the liquid crystal composition may result in raising the lower-limit temperature of a nematic phase in the liquid crystal composition. For this reason, it is desirable that the compounds of formula (5) make up not more than 25% by weight of the liquid crystal composition.

Each of the compounds constituting the composition of the present invention can be synthesized by the prior art processes.

Of the compounds of formulas (1-1) and (1-2), the method of synthesizing those of formulas (1-1-1) and (1-2-1) is disclosed in Japanese Patent Kokai 10-251186 (Japanese Patent Application 9-72708). Of the compounds of formula (2), the method of synthesizing those of formulas (2-2) and (2-7), respectively is disclosed in Japanese Patent Kokai 59-176240 and 4-300861. Of the compounds of formulas (3-1) and (3-2), the method of synthesizing those of formulas (3-1-2) and (3-2-2) is disclosed in Japanese Patent Kokai 1-308239. Of the compounds of formula (3-3), the method of synthesizing those of formula (3-3-1) is disclosed in Japanese Patent Kokai 63-152334. Of the compounds of formula (3-4), the method of synthesizing those of formula (3-4-2) is disclosed in Japanese Patent Kokai 2-237949. Of the compounds of formula (4), the method of synthesizing those of formula (4-1) is disclosed in Japanese Patent Kokai 58-0552. Of the compounds of formula (5), the method of synthesizing those of formula (5-2) is disclosed in Japanese Patent Kokai 2-233626.

Other liquid crystalline compounds than each compound represented by the above-mentioned formula can be used in admixture therewith in the liquid crystal composition within the range of not injuring the object of the present invention. To the liquid crystal composition of the invention may be added chiral dopants for the purpose of inducing the helical structure of liquid crystal molecules to adjust necessary twist angle. The liquid crystal composition of the invention can be also used as a liquid crystal composition for guest-host (GH) mode by incorporating therein dichroic dyes such as those of merocyanines, styryl derivatives, azo compounds, azomethines, azoxy compounds, quinophthalones, anthraquinones and tetrazine derivatives, etc. Further, the liquid crystal composition of the invention can be used as a liquid crystal composition for a polymer-dispersion type display device and for electrically controlled birefringence (ECB) mode and dynamic scattering (DS) mode.

The liquid crystal composition of the invention is prepared by a process conventional per se. In general, a process can be employed wherein various compounds are mixed and dissolved each other at an elevated temperature.

This invention is further illustrated by the following examples and comparative examples in which all parts and percentages (%) are by weight unless otherwise indicated.

Further, the compounds used in the Examples and Comparative Examples are expressed by the symbols as shown below.

Indication of the compounds using the symbols

| | Symbol |
|---|---|
| 1) Left terminal group R- | |
| $C_nH_{2n+1}$- | n- |
| $C_nH_{2n+1}CH=CHC_mH_{2m}$- | nVm- |
| $C_nH_{2n+1}OC_mH_{2m}$- | nOm- |
| $CH_2=CHC_nH_{2n}$- | Vn- |
| $CH_2=CH$— | V- |
| $C_nH_{2n+1}CH=CH$— | nV- |
| $CF_2=CH$— | VFF- |
| $CF_2=CHC_nH_{2n}$- | VFFn- |
| 2) Ring structure $-(A_1)$-, $-(A_n)$- | |
| 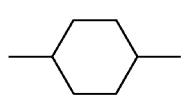 | H |
| 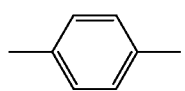 | B |
| 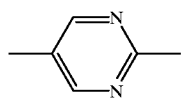 | Py |
| 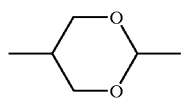 | D |

| | Symbol |
|---|---|
| <br>3) Linking group $-Z_1$-, $-Z_n$- | B(F)<br><br>B(F,F) |
| $-CH_2CH_2$— | 2 |
| —COO— | E |
| —C≡C— | T |
| $-CF_2O$— | CF2O |
| 4) Right terminal group -X | |
| —CN | —C |
| $-OC_nH_{2n+1}$ | —On |
| —F | —F |
| $-C_nH_{2n+1}$ | -n |
| —Cl | —CL |
| $-CH=CH_2$ | -V |
| $-CH=CF_2$ | -VFF |
| 5) Example of indication | |

3-HB(F,F)CF2OB(F,F)—C

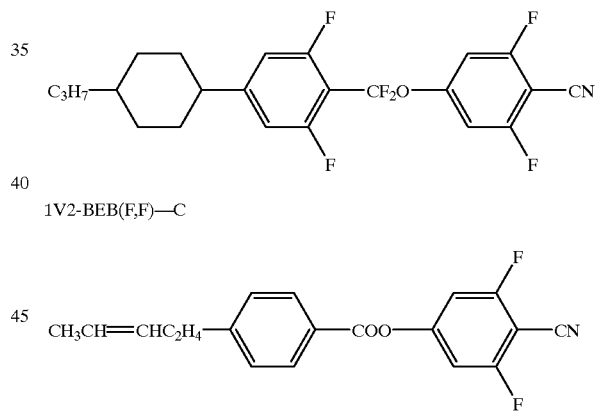

1V2-BEB(F,F)—C

For the characteristics of the liquid crystal composition, the upper limit of the nematic phase temperature range was expressed as $T_{NI}$, the lower limit of the nematic phase temperature range was expressed as $T_c$, the viscosity was expressed as η, the optical anisotropy was expressed as Δn, the threshold voltage was expressed as Vth, the temperature dependence of threshold voltage was expressed as δ, the stability to heat was expressed as dH, the stability to ultraviolet ray was expressed as dUV and the steepness was expressed as γ.

$T_{NI}$ was determined by measuring the temperature of a nematic-isotropic phase transition during the temperature rising process using a polarization microscope. $T_c$ was judged by a liquid crystal phase which appeared after the liquid crystal composition was allowed to stand for 30 days in a freezer at 0° C., −10° C., −20° C., −30° C. and −40° C., respectively. For example, when a liquid crystal composition is in a nematic state at −20° C., and in a crystallized or smectic state at −30° C., $T_c$ of the liquid crystal composition was expressed as <−20° C. η was measured at 20° C. Δn was measured at 25° C. by using a lamp with a wavelength of 589 nm for light source. Vth was measured at 25° C.

δ was determined from the following equation (A) using Vth measured at 20° C. and 50° C. Lower δ means smaller temperature dependence of threshold voltage.

$$\delta(V/°C.)=(Vth20-Vth50)/(50°C.-20°C.) \quad (A)$$

in which Vth50 represents Vth at 50° C. and Vth20 represents Vth at 20° C. Vth at 20° C., 25° C. and 50° C. refers to the value of voltage applied when a rectangular wave having a frequency of 32 Hz is applied in the normally white mode using a cell having a thickness of 9.0 μm and a twist angle of 80° and a transmittance of light passing through the cell becomes 90%. dH was determined from the following equation (B). Lower dH means higher stability to heat.

$$dH(\mu A)=Iha(\mu A)-Ihb(\mu A) \quad (B)$$

in which Iha represents an electric current value flowing into a liquid crystal composition after heating and Ihb represents an electric current value flowing into a liquid crystal composition before heating. The liquid crystal composition was heated in an air at 150° C. for one hour. The electric current value was determined by placing the liquid crystal composition into a cell for evaluation (a TN cell having a cell thickness of 10 μm and an electrode area of 1 cm², provided with two opposite glass substrates deposited diagonally with silicon dioxide) and applying a rectangular wave of 3 V and 32 Hz to the cell. The electric current was measured at 25° C.

dUV was determined from the following equation (C). Lower dUV means higher stability to ultraviolet ray.

$$dUV(\mu A)=Iuva(\mu A)-Iuvb(\mu A) \quad (C)$$

in which Iuva represents an electric current value flowing into a liquid crystal composition after exposure to ultraviolet ray and Iuvb represents an electric current value flowing into a liquid crystal composition before exposure to ultraviolet ray. The exposure of the liquid crystal composition to ultraviolet ray was carried out by exposing for 20 minutes the liquid crystal composition contained in the cell for evaluation to ultraviolet ray emitted from an extra-high pressure mercury lump (manufactured by Ushio Electric Inc.) having an energy of 12 mW/cm², with a distance between a light source and an object being 20 cm. The electric current value was measured in a similar manner as mentioned above.

γ was determined from the following equation (D). More approach of γ to 1 means better steepness.

$$\gamma=V20/V80 \quad (D)$$

in which V20 and V80 refer to the value of voltage applied when a transmittance of light passing through the cell in the normally yellow mode becomes 20% and 80%, respectively. The measurement of V20 and V80 was carried out by using a cell having a twist angle of 240° and a thickness of (0.80/Δn) μm and applying a rectangular wave having a frequency of 70 Hz at 25° C. The liquid crystal composition used in the measurement of V20 and V80 was prepared by adding cholesteryl nonanoate based on 100 parts of the liquid crystal composition so that a ratio (d/P) of a cell thickness d and a pitch length P in the twist becomes 0.50.

Comparative Example 1

The composition (Example 5) with the lowest threshold voltage of the compositions disclosed in Japanese Patent Kokai 7-300582 was prepared in the following manner.

| | |
|---|---|
| 4O1-BEB(F)-C | 8% |
| 1O1-HBEB(F)-C | 5% |
| 3-H2B(F)EB(F)-C | 7% |
| 3-HB-C | 8% |
| 1O1-HB-C | 7% |
| 3-HHB(F,F)-F | 10% |
| 2-HBB-F | 5% |
| 3-HBB-F | 5% |
| 1O1-HH-3 | 8% |
| 1O1-HH-5 | 7% |
| 3-HHB-3 | 14% |
| 2-BTB-1 | 4% |
| 1-BTB-6 | 8% |
| 4-BTB-4 | 4% |

The above composition had the following characteristics:

| | |
|---|---|
| $T_{NI}$ | = 70° C. |
| $T_C$ | < −30° C. |
| η | = 24.3 mPa·s |
| Δn | = 0.127 |
| Vth | = 1.40 V |
| δ | = 0.005 V/° C. |
| dH | = 1.95 μA |
| dUV | = 5.80 μA |

A liquid crystal composition prepared by adding 1.60 parts by weight of cholesteryl nonanoate to 100 parts by weight of the above liquid crystal composition had 1.118 of γ. This composition had poor stability to heat and ultraviolet ray and poor steepness.

Comparative Example 2

The composition (Example 6) with the lowest threshold voltage of the compositions disclosed in Japanese Patent Kokai 7-300585 was prepared in the following manner.

| | |
|---|---|
| 5O1-HBEB(F)-C | 10% |
| 1V2-BEB(F,F)-C | 10% |
| 2-HEB-C | 8% |
| 3-HEB-C | 4% |
| 2-HBB-F | 5% |
| 3-HBB-F | 5% |
| 5-PyB(F)-F | 7% |
| 3-HHB(F,F)-F | 10% |
| 3-HH-4 | 10% |
| 3-HB-O2 | 10% |
| 3-HHB-1 | 6% |
| 3-HB(F)TB-2 | 8% |
| 3-HB(F)TB-3 | 7% |

The above composition had the following characteristics:

| | |
|---|---|
| $T_{NI}$ | = 77.8° C. |
| $T_C$ | < −30° C. |
| η | = 31.0 mPa·s |
| Δn | = 0.140 |
| Vth | = 1.17 V |
| δ | = 0.003 V/° C. |
| dH | = 1.75 μA |
| dUV | = 4.95 μA |

A liquid crystal composition prepared by adding 1.40 parts by weight of cholesteryl nonanoate to 100 parts by weight of the above liquid crystal composition had 1.125 of γ. This composition had poor stability to heat and ultraviolet ray and poor steepness.

Comparative Example 3

The composition (Example 5) with the lowest threshold voltage of the compositions disclosed in Japanese Patent Kokai 7-300584 was prepared in the following manner.

| | |
|---|---|
| 3O1-BEB(F)-C | 8% |
| 5O1-HBEB(F)-C | 8% |
| V2-HB-C | 7% |
| 1V2-HB-C | 7% |
| 2-BEB-C | 8% |
| 3-BEB-C | 4% |
| 3-HHB(F,F)-F | 10% |
| 5-HEB-F | 5% |
| 7-HEB-F | 5% |
| 3-HH-4 | 10% |
| 2-BTB-O1 | 8% |
| 3-H2BTB-2 | 5% |
| 3-H2BTB-3 | 5% |
| 3-HB(F)TB-2 | 5% |
| 3-HB(F)TB-3 | 5% |

The above composition had the following characteristics:

$T_{NI}$ = 73.4° C.
$T_C$ < -30° C.
η = 28.0 mPa·s
Δn = 0.151
Vth = 1.33 V
δ = 0.004 V/° C.
dH = 2.03 μA
dUV = 5.37 μA

A liquid crystal composition prepared by adding 1.68 parts by weight of cholesteryl nonanoate to 100 parts by weight of the above liquid crystal composition had 1.112 of γ. This composition had poor stability to heat and ultraviolet ray and poor steepness.

Comparative Example 4

As the composition analogous to that of the present invention, the composition illustrated in Composition Example 19 of WO 96/11897 was prepared in the following manner.

| | |
|---|---|
| 3-HBCF2OB(F,F)-C | 6% |
| 5-HBCF2OB(F,F)-C | 6% |
| 3-HB(F,F)CF2OB-C | 6% |
| 5-HB(F,F)CF2OB-C | 6% |
| 2O1-BEB(F)-C | 2% |
| 3O1-BEB(F)-C | 8% |
| 2-HB(F)-C | 5% |
| 3-HB(F)-C | 7% |
| 3-HHB(F)-C | 3% |
| 2-HHB(F)-F | 5% |
| 3-HHB(F)-F | 5% |
| 5-HHB(F)-F | 5% |
| 3-H2BTB-2 | 4% |
| 3-H2BTB-3 | 4% |
| 3-H2BTB-4 | 4% |
| 3-HB(F)TB-2 | 4% |
| 3-HB(F)TB-3 | 4% |
| 3-HB(F)TB-4 | 4% |

-continued

| | |
|---|---|
| 3-HHB-1 | 6% |
| 3-HHB-3 | 3% |
| 3-HHB-O1 | 3% |

The above composition had the following characteristics:

$T_{NI}$ = 97.7° C.
$T_C$ < -20° C.
η = 38.4 mPa·s
Δn = 0.141
Vth = 1.52 V
δ = 0.013 V/° C.
dH = 0.05 μA
dUV = 0.10 μA

A liquid crystal composition prepared by adding 1.70 parts by weight of cholesteryl nonanoate to 100 parts by weight of the above liquid crystal composition had 1.113 of γ. This composition had high threshold voltage, high temperature dependence of threshold voltage and poor steepness.

EXAMPLE 1

The following liquid crystal composition comprising the first, second and third components was prepared.

| | |
|---|---|
| Compounds of formulas (1-1) or (1-2): | |
| 2-HB(F,F)CF2OB(F,F)-C | 8% |
| 3-HB(F,F)CF2OB(F,F)-C | 8% |
| 4-HB(F,F)CF2OB(F,F)-C | 7% |
| 5-HB(F,F)CF2OB(F,F)-C | 7% |
| Compound of formula (2): | |
| 3-HB-C | 25% |
| Compounds of formulas (3-1) to (3-4): | |
| VFF-HHB-1 | 9% |
| VFF2-HHB-1 | 21% |
| 3-HB(F)TB-2 | 5% |
| 3-HB(F)TB-3 | 4% |
| 1O1-HBBH-5 | 6% |

The above composition had the following characteristics:

$T_{NI}$ = 90.3° C.
$T_C$ < -30° C.
η = 37.3 mPa·s
Δn = 0.134
Vth = 1.20 V
δ = 0.002 V/° C.
dH = 0.03 μA
dUV = 0.04 μA

A liquid crystal composition prepared by adding 1.87 parts by weight of cholesteryl nonanoate to 100 parts by weight of the above liquid crystal composition had 1.058 of γ. This composition had low threshold voltage, low temperature dependence of threshold voltage and high stability to heat and ultraviolet ray.

EXAMPLE 2

The following liquid crystal composition comprising the first, second and third components was prepared.

| Compounds of formulas (1-1) or (1-2): | |
|---|---|
| 2-HB(F,F)CF2OB(F,F)-C | 5% |
| 3-HB(F,F)CF2OB(F,F)-C | 5% |
| 4-HB(F,F)CF2OB(F,F)-C | 5% |
| 5-HB(F,F)CF2OB(F,F)-C | 5% |
| 2-DB(F,F)CF2OB(F,F)-C | 5% |
| 3-DB(F,F)CF2OB(F,F)-C | 5% |
| 4-DB(F,F)CF2OB(F,F)-C | 5% |
| 5-DB(F,F)CF2OB(F,F)-C | 5% |
| Compound of formula (2): | |
| 3-HB-C | 15% |
| Compounds of formulas (3-1) to (3-4): | |
| 3-HHB-1 | 3% |
| 3-HHB-O1 | 3% |
| 3-HHB-F | 3% |
| VFF2-HHB-1 | 21% |
| 3-H2BTB-2 | 5% |
| 3-H2BTB-3 | 4% |
| 1O1-HBBH-5 | 3% |
| 5-HBBH-3 | 3% |

The above composition had the following characteristics:

$T_{NI}$ = 86.8° C.
$T_C$ < −30° C.
$\eta$ = 39.6 mPa·s
$\Delta n$ = 0.132
Vth = 1.10 V
$\delta$ = 0.003 V/° C.
dH = 0.02 $\mu$A
dUV = 0.03 $\mu$A A liquid crystal composition prepared by adding 1.83 parts by weight of cholesteryl nonanoate to 100 parts by weight of the above liquid crystal composition had 1.060 of $\gamma$. This composition had low threshold voltage, low temperature dependence of threshold voltage and high stability to heat and ultraviolet ray.

EXAMPLE 3

The following liquid crystal composition comprising the first, second and third components was prepared.

| Compounds of formulas (1-1) or (1-2): | |
|---|---|
| 2-HB(F,F)CF2OB(F,F)-C | 7% |
| 3-HB(F,F)CF2OB(F,F)-C | 7% |
| 4-HB(F,F)CF2OB(F,F)-C | 6% |
| 5-HB(F,F)CF2OB(F,F)-C | 6% |
| Compound of formula (2): | |
| 2O1-BEB(F)-C | 5% |
| 3-HB-C | 3% |
| 1V2-BEB(F,F)-C | 8% |
| 3-BEB(F,F)-C | 2% |
| Compounds of formulas (3-1) to (3-4): | |
| 3-HB-O2 | 7% |
| 3-HHEB-F | 5% |
| 5-HHEB-F | 5% |
| 3-HBEB-F | 6% |
| VFF-HHB-1 | 6% |
| VFF2-HHB-1 | 10% |
| 2-BTB-1 | 8% |
| 3-HB(F)TB-2 | 5% |
| 3-HB(F)TB-3 | 4% |

The above composition had the following characteristics:

$T_{NI}$ = 80.1° C.
$T_C$ < −30° C.
$\eta$ = 36.0 mPa·s
$\Delta n$ = 0.141
Vth = 1.15 V
$\delta$ = 0.004 V/° C.
dH = 0.04 $\mu$A
dUV = 0.02 $\mu$A A liquid crystal composition prepared by adding 1.94 parts by weight of cholesteryl nonanoate to 100 parts by weight of the above liquid crystal composition had 1.065 of $\gamma$. This composition had low threshold voltage, low temperature dependence of threshold voltage and high stability to heat and ultraviolet ray.

EXAMPLE 4

The following liquid crystal composition comprising the first, second and third components was prepared.

| Compounds of formulas (1-1) or (1-2): | |
|---|---|
| 2-DB(F,F)CF2OB(F,F)-C | 6% |
| 3-DB(F,F)CF2OB(F,F)-C | 6% |
| 4-DB(F,F)CF2OB(F,F)-C | 6% |
| 5-DB(F,F)CF2OB(F,F)-C | 5% |
| Compound of formula (2): | |
| 3-BEB(F)-C | 6% |
| 3O1-BEB(F)-C | 5% |
| 3-HEB(F,F)-C | 5% |
| 3-H2B(F,F)-C | 5% |
| Compounds of formulas (3-1) to (3-4): | |
| 2-BTB-O1 | 7% |
| 3-HHB-1 | 6% |
| 2-HHB-CL | 6% |
| 4-HHB-CL | 6% |
| 5-HHB-CL | 6% |
| 3-HHEB-F | 6% |
| 5-HHEB-F | 6% |
| 3-HB(F)TB-2 | 5% |
| 3-HB(F)TB-3 | 4% |
| 1O1-HBBH-5 | 4% |

The above composition had the following characteristics:

$T_{NI}$ = 86.8° C.
$T_C$ < −20° C.
$\eta$ = 46.2 mPa·s
$\Delta n$ = 0.135
Vth = 1.01 V
$\delta$ = 0.003 V/° C.
dH = 0.02 $\mu$A
dUV = 0.02 $\mu$A A liquid crystal composition prepared by adding 1.90 parts by weight of cholesteryl nonanoate to 100 parts by weight of the above liquid crystal composition had 1.054 of γ. This composition had low threshold voltage, low temperature dependence of threshold voltage and high stability to heat and ultraviolet ray.

EXAMPLE 5

The following liquid crystal composition comprising the first, second and third components was prepared.

| Compounds of formulas (1-1) or (1-2): | |
|---|---|
| 2-HB(F,F)CF2OB(F,F)-C | 5% |
| 3-HB(F,F)CF2OB(F,F)-C | 5% |
| 4-HB(F,F)CF2OB(F,F)-C | 5% |
| 5-HB(F,F)CF2OB(F,F)-C | 5% |
| 1V2-HB(F,F)CF2OB(F,F)-C | 3% |
| 3O1-HB(F,F)CF2OB(F,F)-C | 3% |
| 5-B(F,F)CF2OB(F,F)-C | 2% |
| 1V2-B(F,F)CF2OB(F,F)-C | 2% |
| 3O1-B(F,F)CF2OB(F,F)-C | 2% |
| Compound of formula (2): | |
| 1V2-HB-C | 10% |
| 3-HB-C | 8% |
| 3-HB(F)-C | 7% |
| 3-HB(F,F)-C | 3% |
| Compounds of formulas (3-1) to (3-4): | |
| V-HHB-1 | 6% |
| VFF2-HHB-1 | 19% |
| 1O1-HBBH-4 | 5% |
| 1O1-HBBH-5 | 5% |
| 5-HBB(F)B-2 | 5% |

The above composition had the following characteristics:

$T_{NI}$ = 83.7° C.
$T_C$ < -30° C.
$\eta$ = 38.0 mPa·s
$\Delta n$ = 0.127
Vth = 1.15 V
$\delta$ = 0.003 V/° C.
dH = 0.02 μA
dUV = 0.04 μA A liquid crystal composition prepared by adding 1.92 parts by weight of cholesteryl nonanoate to 100 parts by weight of the above liquid crystal composition had 1.053 of γ. This composition had low threshold voltage, low temperature dependence of threshold voltage and high stability to heat and ultraviolet ray.

EXAMPLE 6

The following liquid crystal composition comprising the first, second and third components was prepared.

| Compounds of formulas (1-1) or (1-2): | |
|---|---|
| 2-DB(F,F)CF2OB(F,F)-C | 4% |
| 3-DB(F,F)CF2OB(F,F)-C | 4% |
| 4-DB(F,F)CF2OB(F,F)-C | 4% |
| 1V2-DB(F,F)CF2OB(F,F)-C | 3% |
| 3O1-DB(F,F)CF2OB(F,F)-C | 3% |
| Compound of formula (2): | |
| 3-BEB(F,F)-C | 4% |
| 3O1-BEB(F,F)-C | 9% |
| 3-HB-C | 6% |
| 2-BEB-C | 5% |
| Compounds of formulas (3-1) to (3-4): | |
| 3-HB-O2 | 2% |
| 5-HH-VFF | 15% |
| 3-HHB-F | 3% |
| 3-HHB-O1 | 4% |
| VFF2-HHB-1 | 14% |
| 3-HB(F)TB-2 | 7% |
| 3-HB(F)TB-3 | 7% |
| 3-H2BTB-2 | 6% |

The above composition had the following characteristics:

$T_{NI}$ = 85.7° C.
$T_C$ < -30° C.
$\eta$ = 23.7 mPa·s
$\Delta n$ = 0.141
Vth = 1.22 V
$\delta$ = 0.005 V/° C.
dH = 0.03 μA
dUV = 0.03 μA A liquid crystal composition prepared by adding 2.02 parts by weight of cholesteryl nonanoate to 100 parts by weight of the above liquid crystal composition had 1.048 of γ. This composition had low threshold voltage, low temperature dependence of threshold voltage and high stability to heat and ultraviolet ray.

EXAMPLE 7

The following liquid crystal composition comprising the first, second and third components was prepared.

| Compounds of formulas (1-1) or (1-2): | |
|---|---|
| 2-DB(F,F)CF2OB(F,F)-C | 5% |
| 3-DB(F,F)CF2OB(F,F)-C | 4% |
| 4-DB(F,F)CF2OB(F,F)-C | 4% |
| 5-DB(F,F)CF2OB(F,F)-C | 4% |
| Compound of formula (2): | |
| 1V2-BEB(F,F)-C | 14% |
| 3-HB-C | 8% |
| Compounds of formulas (3-1) to (3-4): | |
| V2-HH-VFF | 5% |
| 5-HH-V | 5% |
| 3-HB-O2 | 7% |
| 3-HHEB-F | 5% |
| 5-HHEB-F | 5% |
| 3-HBEB-F | 6% |
| VFF-HHB-1 | 6% |
| VFF2-HHB-1 | 10% |
| 3-HH-4 | 3% |
| 3-HB(F)TB-2 | 5% |
| 3-HB(F)TB-3 | 4% |

The above composition had the following characteristics:

$T_{NI}$ = 84.9° C.
$T_C$ < -30° C.
$\eta$ = 27.9 mPa·s
$\Delta n$ = 0.124

-continued

```
Vth = 1.12 V
 δ  = 0.005 V/° C.
dH  = 0.03 μA
dUV = 0.04 μA
```

A liquid crystal composition prepared by adding 1.76 parts by weight of cholesteryl nonanoate to 100 parts by weight of the above liquid crystal composition had 1.063 of γ. This composition had low threshold voltage, low temperature dependence of threshold voltage and high stability to heat and ultraviolet ray.

EXAMPLE 8

The following liquid crystal composition comprising the first, second, third and fourth components was prepared.

| Compounds of formulas (1-1) or (1-2): | |
|---|---|
| 2-DB(F,F)CF2OB(F,F)-C | 5% |
| 3-DB(F,F)CF2OB(F,F)-C | 5% |
| 4-DB(F,F)CF2OB(F,F)-C | 5% |
| 5-DB(F,F)CF2OB(F,F)-C | 5% |
| 2-HB(F,F)CF2OB(F,F)-C | 5% |
| 3-HB(F,F)CF2OB(F,F)-C | 5% |
| Compound of formula (2): | |
| 2O1-BEB(F)-C | 6% |
| 3-HB(F)-C | 5% |
| Compounds of formulas (3-1) to (3-4): | |
| 5-HH-VFF | 15% |
| 2-BTB-1 | 7% |
| 3-HB(F)TB-3 | 6% |
| 3-HHB-1 | 3% |
| Compounds of formula (4) | |
| 2-HHB(F)-C | 14% |
| 3-HHB(F)-C | 9% |
| 3-HHB-C | 5% |

The above composition had the following characteristics:

```
T_NI = 84.5° C.
T_C  < -30° C.
 η   = 47.0 mPa·s
Δn   = 0.134
Vth  = 1.02 V
 δ   = 0.003 V/° C.
dH   = 0.05 μA
dUV  = 0.03 μA
```

A liquid crystal composition prepared by adding 1.59 parts by weight of cholesteryl nonanoate to 100 parts by weight of the above liquid crystal composition had 1.057 of γ. This composition had low threshold voltage, low temperature dependence of threshold voltage and high stability to heat and ultraviolet ray.

EXAMPLE 9

The following liquid crystal composition comprising the first, second, third and fourth components was prepared.

| Compounds of formulas (1-1) or (1-2): | |
|---|---|
| 2-DB(F,F)CF2OB(F,F)-C | 5% |
| 3-DB(F,F)CF2OB(F,F)-C | 5% |
| 4-DB(F,F)CF2OB(F,F)-C | 5% |
| 5-DB(F,F)CF2OB(F,F)-C | 5% |
| Compound of formula (2): | |
| 3-HB-C | 20% |
| 1V2-BEB(F,F)-C | 10% |
| Compounds of formulas (3-1) to (3-4): | |
| 3-HHB-3 | 12% |
| 3-HHB-O1 | 5% |
| 3-HHEB-F | 3% |
| 5-HHEB-F | 3% |
| 3-H2BTB-2 | 5% |
| 3-H2BTB-3 | 5% |
| Compounds of formula (5): | |
| 2-HBEB(F,F)-F | 3% |
| 3-HBEB(F,F)-F | 5% |
| 5-HBEB(F,F)-F | 3% |
| 3-HHEB(F,F)-F | 2% |
| 3-HHB(F,F)-F | 2% |
| 3-HHB(F)-F | 2% |

The above composition had the following characteristics:

```
T_NI = 82.8° C.
T_C  < -30° C.
 η   = 37.1 mPa·s
Δn   = 0.130
Vth  = 1.08 V
 δ   = 0.004 V/° C.
dH   = 0.05 μA
dUV  = 0.04 μA
```

A liquid crystal composition prepared by adding 1.75 parts by weight of cholesteryl nonanoate to 100 parts by weight of the above liquid crystal composition had 1.070 of γ. This composition had low threshold voltage, low temperature dependence of threshold voltage and high stability to heat and ultraviolet ray.

EXAMPLE 10

The following liquid crystal composition comprising the first, second, third, fourth and fifth components was prepared.

| Compounds of formulas (1-1) or (1-2): | |
|---|---|
| 2-HB(F,F)CF2OB(F,F)-C | 5% |
| 3-HB(F,F)CF2OB(F,F)-C | 5% |
| 4-HB(F,F)CF2OB(F,F)-C | 5% |
| 5-HB(F,F)CF2OB(F,F)-C | 5% |
| Compound of formula (2): | |
| 1V2-BEB(F,F)-C | 10% |
| 3O1-BEB(F)-C | 4% |
| 3-HB(F)-C | 12% |
| Compounds of formulas (3-1) to (3-4): | |
| 3-HHEB-F | 6% |
| 5-HHEB-F | 6% |
| 3-HHB-1 | 8% |
| 3-HHB-O1 | 4% |
| 3-HHB-F | 5% |

-continued

| | |
|---|---|
| 3-HHB-3 | 7% |
| 3-HB(F)TB-2 | 2% |
| Compound of formula (4): | |
| 3-HHB(F)-C | 10% |
| Compound of formula (5): | |
| 3-HHB(F)-F | 6% |

The above composition had the following characteristics:

$T_{NI}$ = 94.9° C.
$T_C$ < −20° C.
η = 44.5 mPa · s
Δn = 0.120
Vth = 1.16 V
δ = 0.003 V/° C.
dH = 0.02 μA
dUV = 0.03 μA

A liquid crystal composition prepared by adding 2.01 parts by weight of cholesteryl nonanoate to 100 parts by weight of the above liquid crystal composition had 1.060 of γ. This composition had low threshold voltage, low temperature dependence of threshold voltage and high stability to heat and ultraviolet ray.

As shown in the above Examples, the present invention can provide the liquid crystal compositions for STN, especially having low threshold voltage, low temperature dependence of threshold voltage and high stability to heat and ultraviolet ray, while satisfying general characteristics required for the STN display mode.

What is claimed is:

1. A liquid crystal composition which comprises:

as a first component at least one of the compounds of the following formulas (1-1) and (1-2);

as a second component at least one of the compounds of the following formula (2); and as a third component at least one of the compounds of the following formulas (3-1) to (3-4)

(1-1)

(1-2)

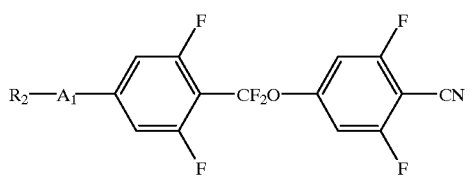

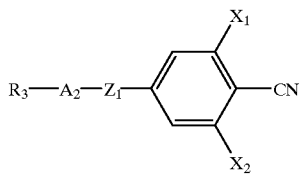
(2)

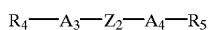
(3-1)

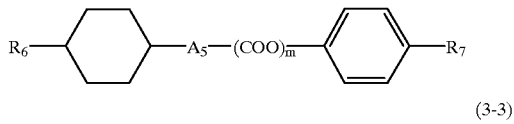
(3-2)

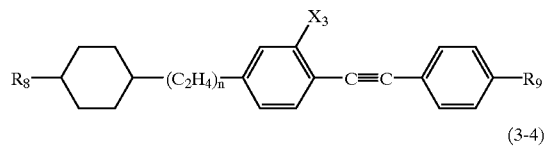
(3-3)

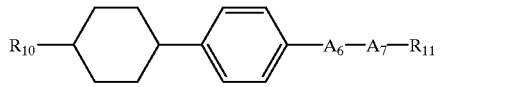
(3-4)

in which $R_1$, $R_2$ and $R_3$ each independently represent an alkyl group of 1–10 carbons wherein any one of the —$CH_2$— groups may be replaced by —O— or —CH=CH—; $R_4$, $R_5$ and $R_6$ each independently represent an alkyl group of 1–10 carbons wherein any one of the —$CH_2$— groups may be replaced by —O— or —CH=CH—, or wherein one or more hydrogen atoms may be replaced by fluorine atoms; $R_7$ represents Cl, F or an alkyl group of 1–10 carbons wherein any one of the —$CH_2$— groups may be replaced by —O—; $R_8$, $R_9$ and $R_{11}$ each independently represent an alkyl group of 1–10 carbons; $R_{10}$ represents an alkyl group of 1–10 carbons wherein any one of the —$CH_2$— groups may be replaced by —O—; $A_1$ represents trans-1,4-cyclohexylene or trans-1,3-dioxane-2,5-diyl; $A_2$, $A_3$, $A_4$, $A_5$ and $A_7$ each independently represent trans-1,4-cyclohexylene or 1,4-phenylene; $A_6$ represents 1,4-phenylene which may be substituted by F; $Z_1$ represents —COO—, —$CH_2CH_2$— or a single bond; $Z_2$ represents —C≡C— or a single bond; m and n each independently represent 0 or 1; and $X_1$, $X_2$ and $X_3$ each independently represent H or F.

2. The liquid crystal composition of claim 1 which further comprises as a fourth component at least one of the compounds of the following formula (4)

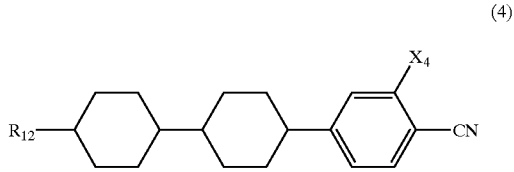
(4)

wherein $R_{12}$ represents an alkyl group of 1–10 carbons and $X_4$ represents H or F.

3. The liquid crystal composition of claim 1 which further comprises as a fourth component at least one of the compounds of the following formula (5)

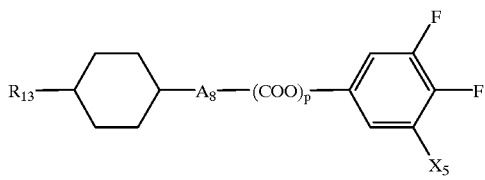
(5)

wherein $R_{13}$ represents an alkyl group of 1–10 carbons; $A_8$ represents trans-1,4-cyclohexylene or 1,4-phenylene; p represents 0 or 1; and $X_5$ represents H or F.

4. The liquid crystal composition of claim 1 wherein the first component comprises 5–50% by weight, the second component comprises 5–40% by weight and the third component comprises 10–70% by weight, based on the total weight of the liquid crystal composition.

5. The liquid crystal composition of claim 1, which further comprises, as a fourth component, at least one of the compounds of the following formula (4):

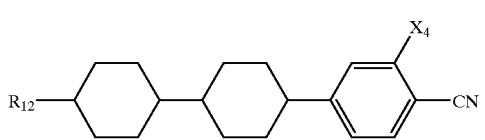
(4)

wherein $R_{12}$ represents an alkyl group of 1–10 carbons and $X_4$ represents H or F; and as a fifth component, at least one of the compounds of the following formula (5):

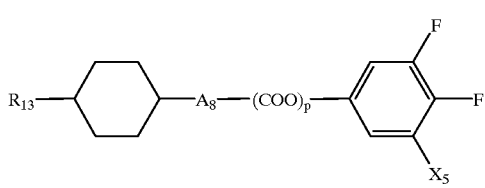
(5)

wherein $R_{13}$ represents an alkyl group of 1–10 carbons; $A_8$ represents trans-1,4-cyclohexylene or 1,4-phenylene; p represents 0 or 1; and $X_5$ represents H or F.

6. The liquid crystal composition of claim 4, which further comprises, as a fourth component, not more than 35% of at least one of the compounds of the following formula (4), based on the total weight of the liquid crystal composition:

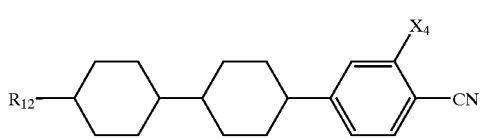
(4)

wherein $R_{12}$ represents an alkyl group of 1–10 carbons and $X_4$ represents H or F.

7. The liquid crystal composition of claim 4, which further comprises, as a fourth component, not more than 25% of at least one of the compounds of the following formula (5), based on the total weight of the liquid crystal composition:

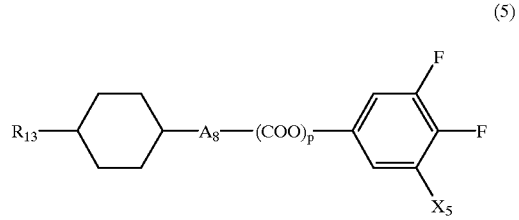
(5)

wherein $R_{13}$ represents an alkyl group of 1–10 carbons; $A_8$ represents trans-1,4-cyclohexylene or 1,4-phenylene; p represents 0 or 1; and $X_5$ represents H or F.

8. The liquid crystal composition of claim 4, which further comprises, as a fourth component, not more than 35% of at least one of the compounds of the following formula (4):

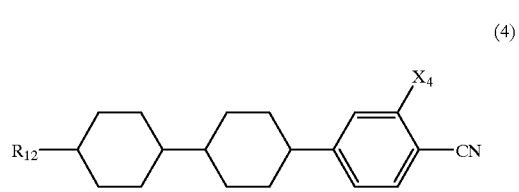
(4)

wherein $R_{12}$ represents an alkyl group of 1–10 carbons and $X_4$ represents H or F; and as the fifth component not more than 25% of at least one of the compounds of the following formula (5):

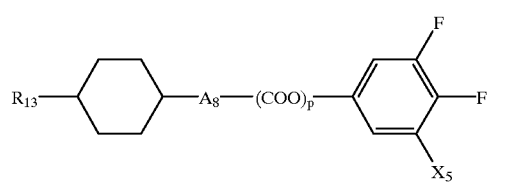
(5)

wherein $R_{13}$ represents an alkyl group of 1–10 carbons; $A_8$ represents trans-1,4-cyclohexylene or 1,4-phenylene; p represents 0 or 1; and $X_5$ represents H or F.

9. A liquid crystal display device using the liquid crystal composition set forth in any one of claims 1, 2, 3, 4, 5, 6, 7 or 8.

* * * * *